(12) United States Patent
Henze

(10) Patent No.: US 11,374,501 B1
(45) Date of Patent: Jun. 28, 2022

(54) PHASE BALANCER INCLUDING POWER CONVERSION CIRCUITS

(71) Applicant: Product Development Associates, Inc., Burnsville, MN (US)

(72) Inventor: Christopher Paul Henze, Lakeville, MN (US)

(73) Assignee: Product Development Associates, Inc., Burnsville, MN (US)

( * ) Notice: Subject to any disclaimer, the term of this patent is extended or adjusted under 35 U.S.C. 154(b) by 0 days.

(21) Appl. No.: 17/214,408

(22) Filed: Mar. 26, 2021

(51) Int. Cl.
| | | |
|---|---|---|
| *H02M 5/458* | (2006.01) | |
| *H02M 1/42* | (2007.01) | |
| *H02M 5/293* | (2006.01) | |
| *H02M 5/452* | (2006.01) | |
| *H02M 1/00* | (2006.01) | |
| *H02M 5/27* | (2006.01) | |

(52) U.S. Cl.
CPC ......... *H02M 5/458* (2013.01); *H02M 1/4266* (2013.01); *H02M 5/293* (2013.01); *H02M 5/452* (2013.01); *H02M 1/0009* (2021.05); *H02M 1/4216* (2013.01); *H02M 5/271* (2013.01)

(58) Field of Classification Search
CPC .... H02M 5/458; H02M 1/4266; H02M 5/293; H02M 5/452; H02M 1/0009; H02M 1/4216; H02M 1/10; H02M 1/14; H02M 5/271

See application file for complete search history.

(56) References Cited

U.S. PATENT DOCUMENTS

| | | | | |
|---|---|---|---|---|
| 5,852,554 A | * | 12/1998 | Yamamoto ............ | H02M 7/493 363/71 |
| 8,737,097 B1 | * | 5/2014 | Swamy .................... | H02M 7/08 363/67 |
| 9,479,077 B1 | * | 10/2016 | Kim ..................... | H02M 1/4216 |
| 2001/0001535 A1 | * | 5/2001 | Johnson, Jr. ............ | H02J 9/061 323/282 |
| 2007/0047277 A1 | * | 3/2007 | Konishi .................... | H02J 3/38 363/131 |
| 2007/0086221 A1 | * | 4/2007 | Ritter .................... | H02M 5/271 363/34 |
| 2008/0280175 A1 | * | 11/2008 | Gurunathan .......... | H02M 7/497 429/432 |
| 2010/0176755 A1 | * | 7/2010 | Hoadley ................. | H02P 27/06 363/5 |
| 2011/0103113 A1 | * | 5/2011 | Ganev ..................... | H02M 7/08 363/126 |
| 2011/0216564 A1 | * | 9/2011 | Swamy ................... | H02M 7/08 363/126 |
| 2012/0112547 A1 | * | 5/2012 | Ghosh ..................... | H02J 9/062 307/66 |

(Continued)

*Primary Examiner* — Yusef A Ahmed
(74) *Attorney, Agent, or Firm* — Mueting Raasch Group

(57) ABSTRACT

A phase balancer includes a plurality of power conversion circuits, a direct current transformer, and a plurality of phase-nodes. Each of the power conversion circuits may include a throughput, a capacitor bank, and a direct current bus. The direct current transformer may be coupled to each of the direct current buses to move energy between the power conversion circuits. Each throughput may be operatively coupled to the capacitor bank of one power conversion circuit and the throughput of another power conversion circuit to move current between the plurality of power conversion circuits.

32 Claims, 4 Drawing Sheets

(56) References Cited

U.S. PATENT DOCUMENTS

| | | | | |
|---|---|---|---|---|
| 2012/0294057 A1* | 11/2012 | Fornage | .................. | H02J 3/381 |
| | | | | 363/131 |
| 2013/0128634 A1* | 5/2013 | Ganev | .................... | H02M 1/12 |
| | | | | 363/64 |
| 2014/0103851 A1* | 4/2014 | Arefeen | .............. | H02M 7/5387 |
| | | | | 363/132 |
| 2014/0103887 A1* | 4/2014 | Akagi | .................... | H02M 7/49 |
| | | | | 323/207 |
| 2014/0140112 A1* | 5/2014 | Zhou | .................... | H02M 1/126 |
| | | | | 363/39 |
| 2014/0306662 A1* | 10/2014 | Kim | ...................... | H02J 7/0016 |
| | | | | 320/118 |
| 2015/0062984 A1* | 3/2015 | Hu | ........................ | H02M 7/493 |
| | | | | 363/71 |
| 2015/0084434 A1* | 3/2015 | Mousavi | ............... | H02M 5/458 |
| | | | | 307/112 |
| 2015/0137772 A1* | 5/2015 | Mawule | .............. | H02M 1/4216 |
| | | | | 323/205 |
| 2016/0285384 A1* | 9/2016 | Youssef | ............. | H02M 1/4216 |
| 2017/0012549 A1* | 1/2017 | Abe | ................... | H02M 3/1588 |
| 2017/0085193 A1* | 3/2017 | Akagi | ................... | H02M 5/293 |
| 2017/0099008 A1* | 4/2017 | Keister | ..................... | H02M 1/12 |
| 2018/0269793 A1* | 9/2018 | Ahsanuzzaman | ....... | H02M 1/32 |
| 2020/0336077 A1* | 10/2020 | Nishimura | ........ | H02M 3/33584 |

\* cited by examiner

PHASE BALANCER INCLUDING POWER CONVERSION CIRCUITS

The present disclosure pertains to systems and methods for balancing phase currents for loads connected to multi-phase power sources.

Phase current balancing (e.g., phase balancing) may be achieved by using a power circuit to draw additional current on lightly loaded phases, store the energy from the additional current in a capacitor bank, and inject the energy to decrease current on heavily loaded phases. A control circuit may be used to dynamically adjust current amplitudes and directions to balance currents that are supplied by the power source while simultaneously regulating the voltage across energy storage circuits. For the power circuit to operate properly, the instantaneous voltage on a positive side of the capacitor bank may be maintained at a voltage greater than the instantaneous voltages at phase inputs. Similarly, the instantaneous voltage at the negative side of the capacitor bank may be maintained at a voltage less than (e.g., more negative) than the instantaneous voltages at the phase inputs. If a neutral connection is available, the capacitor bank mid-point may be operatively coupled to the utility neutral. However, some power distribution systems use a multi-phase power sources without a neutral. Accordingly, an internal "pseudo neutral node" may be created using capacitors to maintain sufficient voltage headroom for the current shaping circuits to function. The capacitors that may be used to create such pseudo neutral nodes may draw a leading current that reduces power efficiency and power factor. A general need exists to provide phase balancing with high efficiency and high power factor.

SUMMARY

Various embodiments of the present disclosure relate to phase balancing of a multi-phase power source using a phase balancer that can balance phases without drawing leading current and reducing power efficiency. Phase balancers as described herein may include power conversion circuits operatively coupled between two phase-nodes and operatively coupled to each other by a direct current transformer. The direct current transformer may be operatively coupled to each power conversion circuit to move energy between the power conversion circuits. Each of the phase-nodes may be operatively coupled to one of the phases of the multi-phase power source. Such phase balancers may not require capacitors to form a pseudo neutral node and may operate at unity power factor.

An exemplary phase balancer may include a plurality of power conversion circuits, a direct current transformer, and a plurality of phase-nodes. Each of the plurality of power conversion circuits may include a throughput, an inductive circuit operatively coupled to the throughput, a capacitor bank operatively coupled to the inductive circuit, and a direct current bus operatively coupled to the capacitor bank. The direct current transformer may be operatively coupled to the direct current bus of each of the plurality of power conversion circuits to move energy between the plurality of power conversion circuits. Each phase-node may be operatively coupled to the capacitor bank of one of the plurality of power conversion circuits and the throughput of another of the plurality of power conversion circuits to move current between the plurality of power conversion circuits. Furthermore, each phase-node of the plurality of phase-nodes may be operatively couplable to a corresponding one of a plurality of phases of a multi-phase power source.

An exemplary method may include moving energy between a plurality of power conversion circuits using a direct current transformer operatively coupled to a direct current bus of each of the plurality of power conversion circuits and moving current between the plurality of power conversion circuits using a plurality of phase-nodes. Each phase-node may be operatively coupled between a capacitor bank of one of the plurality of power conversion circuits and a throughput of another of the plurality of power conversion circuits. Furthermore, each phase-node of the plurality of phase-nodes may be operatively couplable to a corresponding one of a plurality of phases of a multi-phase power source.

An exemplary phase balancer may include a plurality of power conversion circuits, a direct current transformer, and plurality of phase-nodes. Each of the plurality of power conversion circuits may include a throughput, an inductive circuit operatively coupled to the throughput, a capacitor bank operatively coupled to the inductive circuit, and an H-bridge. The capacitor bank may include a positive node, a neutral node, and a negative node. The H-bridge may be operably coupled to the positive and negative nodes of the capacitor bank. The direct current transformer may be operably coupled to the H-bridge of each of the plurality of power conversion circuits. Each phase-node may be operatively coupled between the neutral node of the capacitor bank of one of the plurality of power conversion circuits and the throughput of another of the plurality of power conversion circuits. Furthermore, each phase-node of the plurality of phase-nodes may be operatively couplable to a corresponding one of a plurality of phases of a multi-phase power source.

BRIEF DESCRIPTION OF THE DRAWINGS

Throughout the specification, reference is made to the appended drawings, where like reference numerals designate like elements, and wherein.

DETAILED DESCRIPTION

Exemplary methods, apparatus, and systems shall be described with reference to FIGS. 1-4. It will be apparent to one skilled in the art that elements or processes from one embodiment may be used in combination with elements or processes of the other embodiments, and that the possible embodiments of such methods, apparatus, and systems using combinations of features set forth herein is not limited to the specific embodiments shown in the Figures and/or described herein. Further, it will be recognized that the embodiments described herein may include many elements that are not necessarily shown to scale. Still further, it will be recognized that timing of the processes and the size and shape of various elements herein may be modified but still fall within the scope of the present disclosure, although certain timings, one or more shapes and/or sizes, or types of elements, may be advantageous over others.

In general, the present disclosure describes various embodiments of phase balancers for phase balancing multi-phase power sources. Such phase balancers may include power conversion circuits, a direct current transformer, and phase-nodes. The number of power conversion circuits and phase-nodes may be equal to the number of phases of the multi-phase power source to be balanced. The power conversion circuits and phase-nodes may allow energy and current to be moved between each of the phases. Each of the power conversion circuits may include an input, an inductive circuit operatively coupled to the input, a capacitor bank operatively coupled to the inductive circuit, and a direct current (DC) bus operatively coupled to the capacitor bank. The direct current transformer may be operatively coupled to the direct current bus of each of the power conversion circuits to move energy between the plurality of power conversion circuits. Each phase-node may be operatively coupled between the capacitor bank of one of the power conversion circuits and the input of another of the plurality of power conversion circuits to move current between the power conversion circuits.

Figure 1:
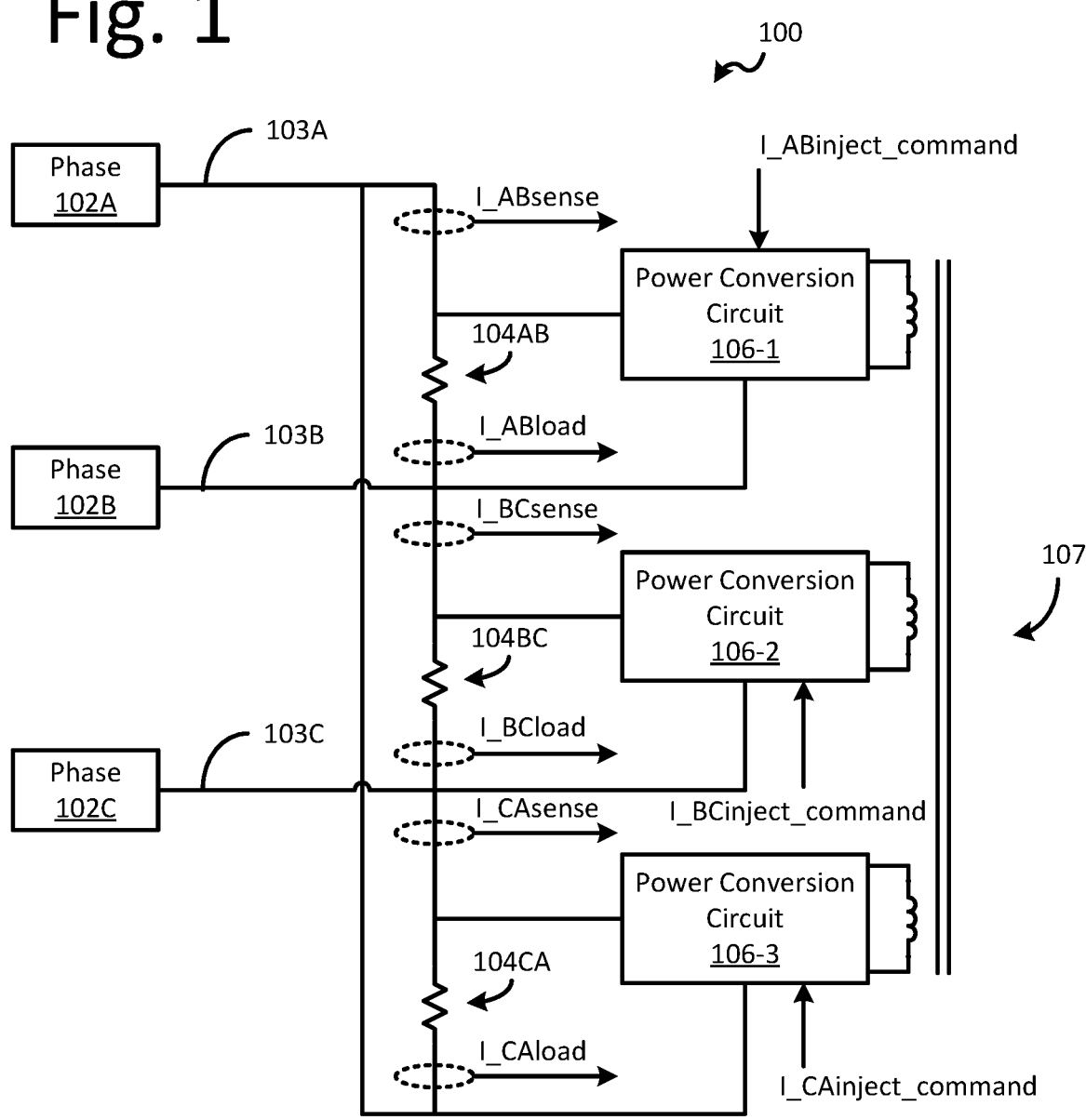
FIG. 1 is a schematic diagram of phase balancer according to one embodiment.
Figure 1:
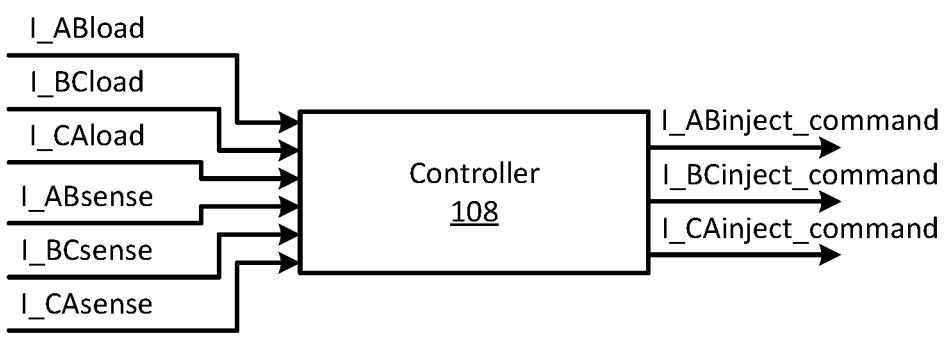

An exemplary phase balancer 100 for balancing phases of a multi-phase power source is depicted in FIG. 1. The phase balancer 100 may include phase-nodes 103A, 103B, 103C, power conversion circuits 106-1, 106-2, 106-3, a transformer 107, and a controller 108. The power conversion circuits 106-1, 106-2, 106-3 may be operatively coupled to phases 102A, 102B, 102C (referred to collectively as phases 102) of a multi-phase power source (not shown) via phase-nodes 103A, 103B, 103C (referred to collectively as phase-nodes 103) to receive energy from and provide energy to the phases 102. In one embodiment, the phase balancer 100 may be provided as a device or system in which the phase-nodes 103 are operatively couplable to phases (e.g., phases 102) of a multi-phase power source. The power conversion circuits 106-1, 106-2, 106-3 may also be operatively coupled to loads 104AB, 104BC, 104CA (referred to collectively as loads 104) powered by the multi-phase power source. Although shown as a three-phase balancer, one of skill in the art will appreciate that the phase balancer 100 can be adapted to work with any number of phases (e.g., include an equal number of power conversion circuits as the multi-phase power source has phases).

Each of the power conversion circuits 106-1, 106-2, 106-3 may be operatively coupled across two of the phases 102 of the multi-phase power source. In other words, at least a portion of the power conversion circuits 106-1, 106-2, 106-3 may be operatively coupled across a phase-leg. As used herein, "phase-leg" generally refers a connection or circuitry operatively coupled between two phases 102 or phase-nodes 103. For example, each of loads 104 are operatively coupled across a phase-leg. Further, for example, each of the power conversion circuits 106 are operatively coupled across a phase-leg. For example, the power conversion circuit 106-1 may be operatively coupled between phases 102A and 102B (e.g., phase-leg AB), the power conversion circuit 106-2 may be operatively coupled between phases 102B and 102C (e.g., phase-leg BC), and the power conversion circuit 106-3 may be operatively coupled between phases 102C and 102A (e.g., phase-leg CA). In other words, phase-node 103A is operatively coupled to power conversion circuits 106-1 and 106-3, phase-node 103B is operatively coupled to power conversion circuits 106-1 and 106-2, and phase-node 103C is operatively coupled to power conversion circuits 106-2 and 106-3. As used herein, "operatively coupled" may generally refer to a direct or indirect connection that may be wired or wireless that provides a link for power and/or communication between apparatus or systems. Communication may include signals, commands, data transfers, sensor signals, etc.

The controller 108 may be operatively coupled to each of the phases 102 and to each of the power conversion circuits 106-1, 106-2, 106-3. The controller 108 can be implemented as one or more of a multi-core processor, a direct memory access controller, a digital signal processor (DSP), an analog-to-digital converter (ADC), a digital-to-analog converter (DAC), a microprocessor, a programmable controller, a hardware controller, a combined hardware and software device, such as a programmable logic controller, and a programmable logic device (e.g., FPGA, ASIC). The controller 108 can include or be operatively coupled to memory, such as RAM, SRAM, ROM, or flash memory.

Figure 2:
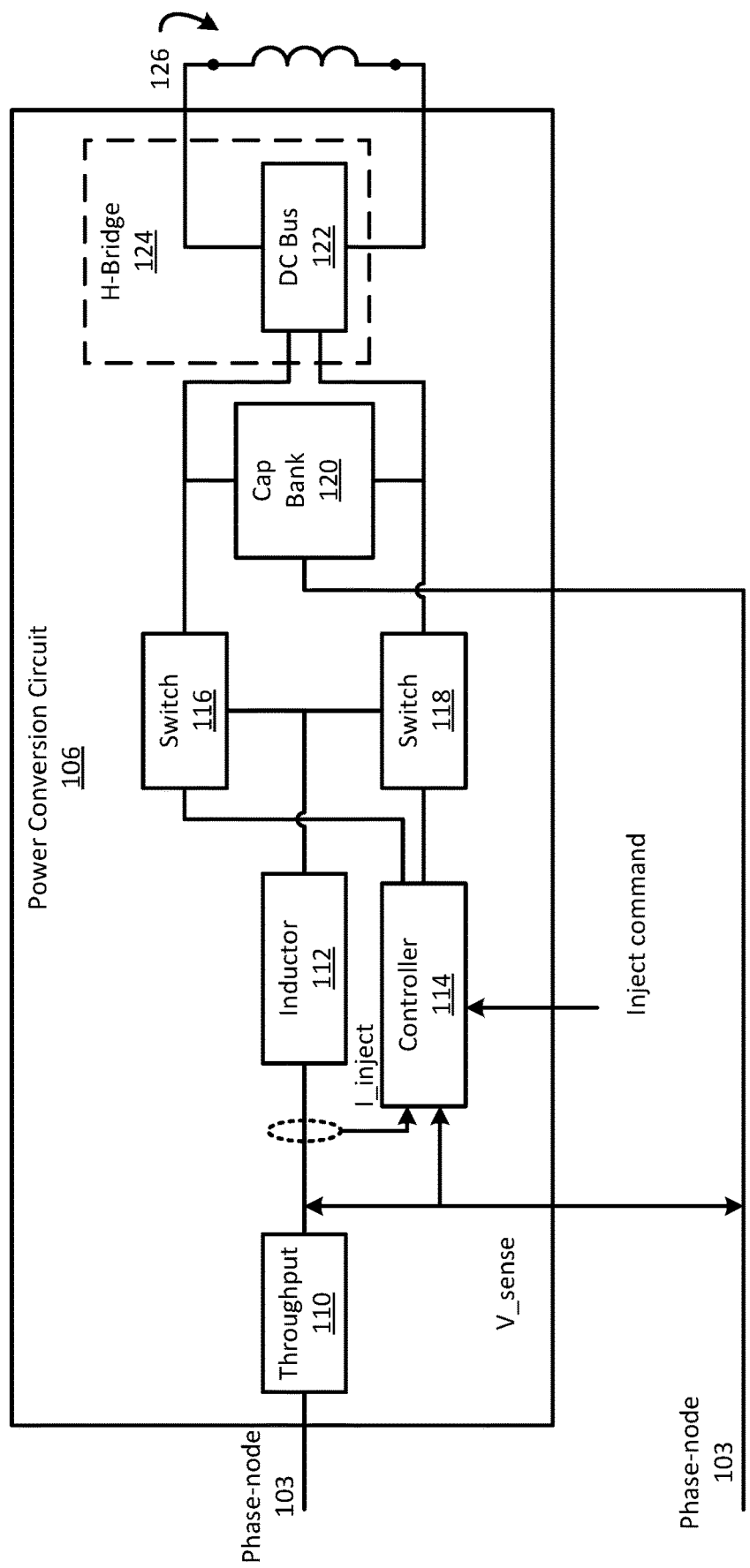
FIG. 2 is a schematic diagram of a power conversion circuit of the phase balancer of FIG. 1.

Each of the power conversion circuits 106-1, 106-2, 106-3 may include circuits, circuitry, apparatus, controllers, or devices to facilitate movement of energy and current from one of the phases 102 or phase-legs to another of the phases 102 or phase-legs. An exemplary power conversion circuit 106 representative of each of the power conversion circuits 106-1, 106-2, 106-3 is depicted in FIG. 2. In other words, the power conversion circuits 106-1, 106-2, 106-3 may be substantially identical and the description of the circuits, circuitry, apparatus, controllers, or devices of power conversion circuit 106 may apply to the each of the power conversion circuits 106-1, 106-2, 106-3. The power conversion circuit 106 may include throughput 110, inductor 112, controller 114, switch 116, switch 118, capacitor bank 120, and DC-bus 122.

Throughput 110 may be both an input and output (e.g., return). In other words, current may flow into the power conversion circuit 106 via the throughput 110 or current may flow out of the power conversion circuit 106 via the throughput 110. The throughput 110 may be operatively coupled to one of the phases 102. For example, throughput 110 of power conversion circuit 106-1 may be operatively coupled to the phase-node 103A, throughput 110 of power conversion circuit 106-2 may be operatively coupled to the phase-node 103B, and throughput 110 of power conversion circuit 106-3 may be operatively coupled to the phase-node 103C.

The inductor 112 may be operatively coupled between the throughput 110 the switches 116, 118. The inductor 112 may include inductive circuits that include a single inductor, multiple inductors, or a combination of passive circuits that result in an inductive circuit. The inductor 112 may act as a low pass filter to filter out switching distortion from the switches 116, 118 and prevent such switching distortion from reaching the phases 102 or the loads 104.

The switch 116 may be operatively coupled between the inductor 112 at a node (e.g., node 135 of FIG. 3) of the capacitor bank 120. The switch 118 may be operatively coupled between the inductor 112 and another node (e.g., node 139 of FIG. 3) of the capacitor bank 120. The switches 116, 118 can be implemented as one or more of a relay, a transistor, a diode, etc. The switches 116, 118 may control current flow between the phases 102 operatively coupled to the power conversion circuit 106 and the capacitor bank 120. The switches 116, 118 may be operatively coupled to and controlled by controller 114. In other words, the controller 114 may be configured to open and close the switches 116, 118.

The controller 114 can be implemented as one or more of a multi-core processor, a direct memory access controller, a digital signal processor (DSP), an analog-to-digital converter (ADC), a digital-to-analog converter (DAC), a microprocessor, a programmable controller, a hardware controller, a combined hardware and software device, such as a programmable logic controller, and a programmable logic device (e.g., FPGA, ASIC). The controller 114 can include or be operatively coupled to memory, such as RAM, SRAM, ROM, or flash memory.

The controller 114 may be operatively coupled to the phases 102 that are operatively coupled to the power conversion circuit to sense a voltage between the operatively coupled phases. Additionally, the controller 114 may be configured to inject current into the phase-node 103 that is operatively coupled to the throughput 110 based on an inject command (e.g., I_ABinject_command, I_BCinject_command, or I_CAinject_command of FIG. 1) received from the controller 108. The controller 114 may control switches 116, 118 to inject current into the phase-node 103 and/or phase-leg that is operatively coupled to the throughput 110. In other words, switches 116, 118 may be opened and closed to allow the capacitor bank 120 to supply current to the phase-node 103 and/or phase-leg. Additionally, the controller may sense or determine a current through the inductor 112 (e.g., I_inject).

Figure 3:
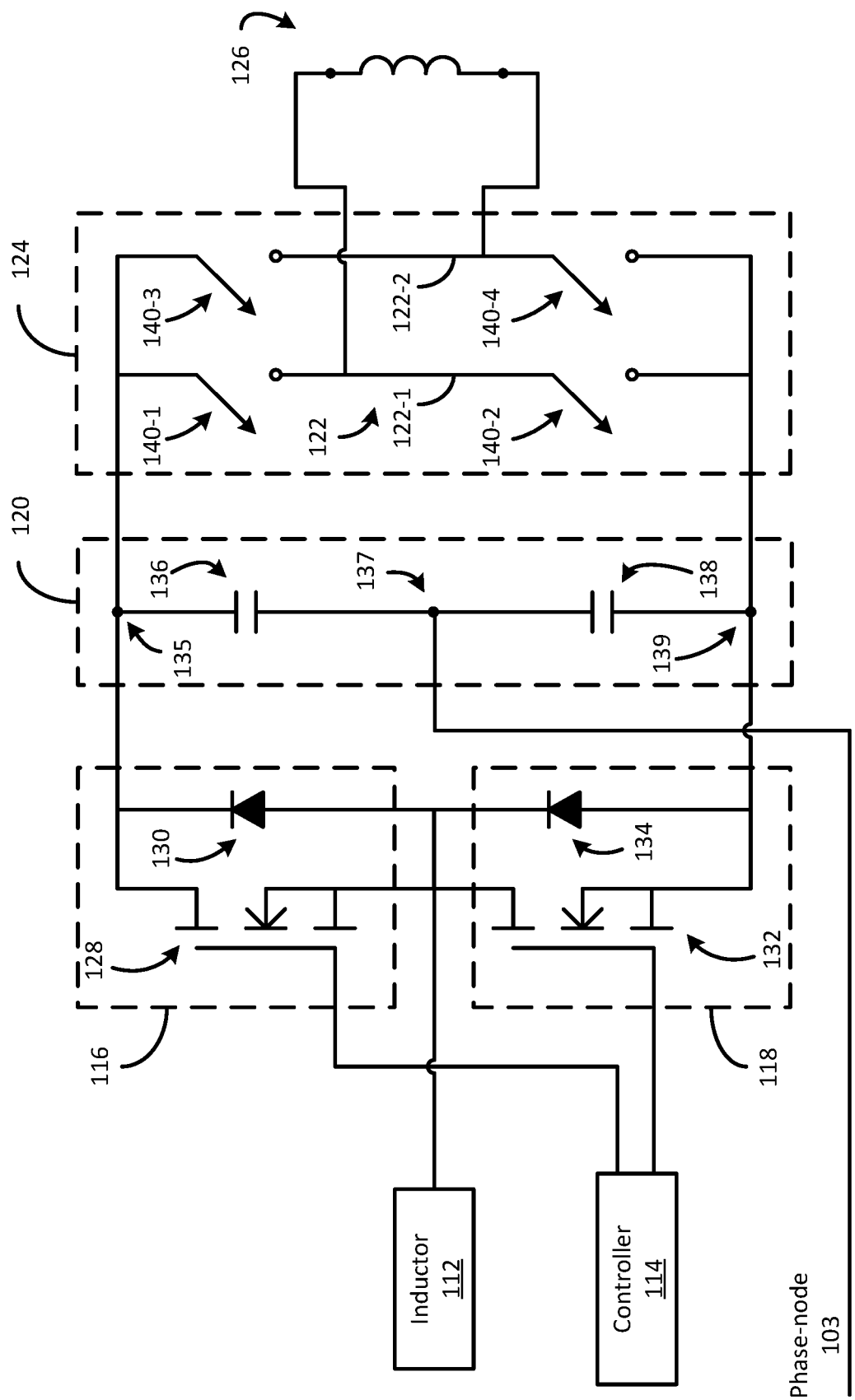
FIG. 3 is a schematic diagram of a portion of the power conversion circuit of FIG. 2.

As shown in FIG. 3, the capacitor bank 120 may include nodes 135, 137, 139 and include a plurality of capacitors or capacitive circuits. A neutral node may be operatively coupled to the one of the phases 102 of the multi-phase power source via one of the phase-nodes 103. Such phase-node of the phase-nodes 103 may be the phase-node that is not operatively coupled to the throughput 110. For example, the neutral node of power conversion circuit 106-1 may be operatively coupled to phase-node 103B while the throughput 110 of the power conversion circuit 106-1 is operatively coupled to the phase-node 103A. The capacitor bank 120 may be configured to store and provide energy. The capacitor bank can receive energy from or provide energy to one of the phases 102 via the throughput 110 or the winding 126 of the transformer 107.

The DC-bus 122 may be operatively coupled to the capacitor bank 120 and a winding 126 of the transformer 107. The DC-bus 122 may optionally be defined by an H-bridge 124. The DC-transformer 107 may allow energy to be passed from one of the power conversion circuits 106-1, 106-2, 106-3 to another of the power conversion circuits 106-1, 106-2, 106-3. As shown, the DC-transformer 107 may be implemented as single three-winding (e.g., 126-1, 126-2, 126-3 of FIG. 1) transformer where each winding is connected to one of the DC-buses 122 of the power conversions circuits 106-1, 106-2, 106-3. The DC-transformer 107 may operatively couple each of the capacitor banks 120 in parallel with one another. In other words, the DC-transformer 107 may operatively couple each of the capacitor banks 120 such that they form a shared capacitor bank between the power conversion circuits 106-1, 106-2, 106-3 and allowing the power conversion circuits to receive energy from or store energy in the shared capacitor bank. Additionally, if the currents flowing into and out of the shared capacitor bank are balanced, the shared capacitor voltage may be constant.

The H-bridges 124 may be configured to operate at a 50% duty cycle. The 50% duty cycle may allow the voltage of each of the DC-buses 122 to have the same voltage differential between the DC-lines (see DC-lines 122-1, 122-2 of FIG. 3) and simultaneously allow the phase voltage to be present between the buses. The DC-transformer 107 may allow DC-current to flow between one of the capacitor banks 120 to another of the capacitor banks 120 in either direction. Such flow of DC-current may allow energy on one or more lightly loaded phase of the phases 102 to be drawn into the phase balancer 100, pass through the DC-transformer 107, and be pushed out onto one or more heavily loaded phase of the phases 102. Accordingly, capacitors that may be required to create a "pseudo neutral node" in typical phase balancers may no longer be required and the phase balancer 100 may operate at unity power factor. In addition to phase imbalance correction, the phase balancer 100 may correct displacement currents and harmonic distortion currents to bring the total load power factor as seen by the source to unity with less than 3% harmonic distortion.

The controller 108 may determine the current drawn into or sourced out of each of the phases 102. Current drawn into or sourced out of each of the phases 102 may be sensed and such sensor signals (e.g., I_ABsense, I_BCsense, and I_CAsense) may be provided to the controller 108. The controller 108 may determine the magnitude and wave shape of the current drawn into or sourced out of each of the phases 102 based on the sensor signals. The current waveform may be equivalent to a frequency of the power source or utility. The phase balancer 100 may be utilized with a power source frequency of at least 50 Hz to no more than 400 Hz. In one embodiment, the phase balancer 100 may be utilized with a power source frequency of 60 Hz.

A reference voltage waveform may be generated by the controller 108 to determine the value of a desired current over time for each of the phases 102. An offset may be added to and subtracted from the reference voltage waveform to determine an upper threshold and a lower threshold on an input current for each of the power conversion circuits 106-1, 106-2, 106-3. A voltage signal, that is proportional to the instantaneous current through the inductor 112 (e.g., I_inject), may be compared to the upper and lower thresholds. If the switch 116 is closed, the current through the inductor 112 will increase. If switch 118 is open, the current through the inductor will decrease. (This is true if the positive and negative dc voltages are greater in magnitude than the utility peak voltages). The controller 114 may change the state of the switches 116, 118 (e.g., open to close and close to open) each time the sensed current of the inductor 112 reaches either the upper or lower thresholds. At the frequency of the multi-phase power source described herein, the current through the inductor 112 may be substantially equal to the current drawn from or injected into the one of the phases 102 operatively coupled to the inductor 112.

The controller 114 may be configured to use various switching techniques to control the current. In one embodiment, a constant switching frequency with a variable pulse width may be used. In another embodiment, a variable switching frequency may be used. Typically, the switching frequency may be three orders of magnitude higher than the multi-phase power source frequency to allow high fidelity resolution in the current waveform. The controller 114 may determine switching instants using digital circuits to perform calculations, by analog circuits using reference waveforms and comparators, or a combination of digital and analog circuits.

The power conversion circuits 106-1, 106-2, 106-3 of the phase balancer 100 may work together to generate the reference voltage waveform for phase balancing. The reference voltage waveform may be generated by determining and scaling a line-to-line voltage (e.g., V_sense of FIG. 2) between each of the phases 102. The line-to-line voltage may be a sinewave in-phase with the phase-to-phase voltage of the multi-phase power source. In one embodiment, the controller 114 determines the line-to-line voltage using an analog differential amplifier with a suitable a gain of at least 0.025 and no more than 0.03. The controller 114 may scale the line-to-line voltage sinewave using a Multiplying Digital to Analog Converter (MDAC). MDACs generally receive a reference signal (Vref) and a digital input and provide a scaled output signal based on the reference signal and the digital input. The reference signal to the MDAC may be the line-to-line voltage sinewave. The line-to-line voltage sinewave may represent the maximum current that can be drawn from the multi-phase power source. The digital input to the MDAC may be a digital number that multiplies the line-to-line sinewave input by a number that ranges from −1 to +1 (e.g., a 10-bit digital number giving 1023 discrete steps). The output of the MDAC may be the reference voltage waveform. Accordingly, if the digital input is a large negative number (e.g., near −1), the reference voltage waveform may cause nearly the maximum sinusoidal current to be injected in the phases 102. If the digital number is a small positive number, a small sinusoidal current may be drawn from the phases 102.

To implement phase balancing (e.g., current draw and/or current injection), the controller 108 may determine a root mean squared (RMS) current for each phase-leg from the sensed current signals (e.g., I_ABsense, I_BCsense, and I_CAsense). An average RMS current may be determined based on the RMS currents of the phase-legs. An error signal for each of the power conversion circuits 106 may be determined based on the RMS current of each of the phase-legs and the average RMS phase-leg current. For example, the RMS current of each of the phase-legs may be compared to the average RMS phase-leg current to create an injection command signal for each of the power conversion circuits 106 (e.g., I_ABinject_command, I_BCinject_command, I_CAinject_command). The controllers 114 of each of the power conversion circuits 106-1, 106-2, 106-3 may use Proportional Integral Differential (PID) feedback to continuously adjusts the digital inputs into the MDACs to drive each current of the phases 102 to equal the average current of the phases 102. A PID feedback continuously calculates an error value (e.g., e(t)) as the difference between a desired setpoint (e.g., the average current of the phases) and a measured process variable (e.g., the current of each phase) and applies a correction based on proportional, integral, and derivative terms (denoted P, I, and D respectively). When the currents of each of the phase-legs are equal, the RMS currents of the phases 102 will also be substantially equal if the displacement and distortion currents are equal in each of the phases 102. Because there can be displacement and distortion current components that are if different proportions in each phase, the phase balancer 100 also includes displacement and distortion correction.

The controller 108 may include a second PID feedback loop, operating simultaneously with the balance PID loop, that regulates the DC-bus 122 voltage. Because each of the DC-buses 122 are operatively coupled to the transformer 107, each of the DC-buses 122 may have the same voltage. Accordingly, only one voltage measurement may be made. Such voltage measurement or determination may be done using a differential op-amp and appropriate scaling or gain. The instantaneous DC-bus 122 voltage may be compared to a reference value and a digital offset may be calculated using a PID feedback routine. The offset value may represent an amount of positive current that is drawn by the power conversion circuit 106 to maintain the DC-bus 122 voltage. The offset may be added equally to each of the power conversion circuits 106-1, 106-2, 106-3 so that it will not interfere with phase balancing. The phase balancer 100 may use power from the multi-phase power source to operate the controllers 108, 114. If a net current drawn from the multi-phase power source is insufficient, the voltage of the DC-bus 122 voltage may collapse. If too much net current is drawn from the multi-phase power source, the voltage of the DC-bus 122 voltage may exceed operational limits of the components of the power conversion circuit 106 that may result in component failure. Although the offset represents current being drawn into the phase balancer 100, the effect of the offset may be to reduce the amount of current sourced back to the multi-phase power source.

In one embodiment, the controller 108 may include a digital signal processor that is used to do the PID calculations. The voltage measurements may be sampled and digitized with an analogue-to-digital converter. The DC-bus 122 voltage PID calculation may be updated every 5 milliseconds and the phase balance calculation may be updated every 200 milliseconds when operating with a 60 Hz power source.

Loads (e.g., loads 104) that have a capacitive or inductive component may introduce a displacement power factor in the system that includes the multi-phase power source, the loads 104, and the phase balancer 100. The displacement power factor may be the power factor caused by a phase shift between voltage and current at the fundamental line frequency (e.g., the frequency of the multi-phase power source). Inductive loads may cause current to lag voltage, while capacitive loads may cause current to lead voltage (e.g., lead-lag). The displacement power factor may cause undesirable losses in power. Accordingly, correcting displacement power factor may increase power efficiency of the system.

The controller 108 may provide displacement power factor correction. The controller 108 may include a MDAC for displacement power factor correction. The controller 108 may include an analog integrator to provide a sine wave with a 90-degree shift from the scaled line to line voltage reference used for phase balancing. Such 90-degree shifted sine wave may be used as the reference input to the MDAC. Thus, a full-scale analog input to the MDAC may be a negative cosine wave with respect to the phase 102 voltage. The lead-lag of each of the phases 102 can be measured using zero-crossing detection. Zero-crossing detection may be used on the phase-to-phase voltage (e.g., V_sense) and the phase currents (e.g., I_ABsense, I_BCsense, and I_CAsense). The phase-to-phase voltage may also be referred to as the line-to-line or phase-leg voltage. The lead-lag may be determined based on the zero crossing of the phase voltage and the zero crossing of the phase current. In other words, whether the current leads the voltage or whether the current lags the voltage may be determined based on the zero-crossing detection, for example, a comparison of time at which each signal has a zero-crossing. The controller 108 may use a digital proportional integral (PI) loop to provide an input to the digital side of the MDAC. The digital input may be used to drive the zero crossing of the phase-leg current to match the zero crossing of the phase-leg voltage. As the digital input is adjusted, the current injected by the power conversion circuits 106 may be adjusted. The PI feedback loop may continually adjust the digital input which in turn adjusts the current injected to the phases 102 to match the phase current and phase voltage zero crossings.

Distortion power factor may be caused when a load (e.g., loads 104) draws non-linear current (e.g., harmonic distortion) in response to the voltage provided by the multi-phase power source. Distortion power factor may also cause undesirable losses in power. Accordingly, correcting distortion power factor may increase power efficiency of the system.

While the phase balancer 100 cannot control load characteristics that generate this distortion, the phase balancer 100 can prevent the distortion currents from flowing to the multi-phase power source. In other words, the phase balancer 100 may correct the distortion power factor. The phase balancer 100 may prevent distortion currents from flowing to the multi-phase power source by measuring the load current, separating the distortion current from the source current, and generating a current that is identical to the distortion current. In other words, the phase balancer 100 may provide the distortion current required by the load instead of such current being drawn directly from the multi-phase power source. Thus, the distortion current may not flow through the multi-phase power source.

The controller 108 may generate a voltage signal proportional to the sensed current (e.g., load current). In one embodiment, the controller 108 may use a current transformer to generate the voltage signal proportional to the load current. The generated voltage signal may be filtered to determine the component of the load current provided by the multi-phase power source. In other words, the harmonic distortion may be filtered out to determine the current provided by the multi-phase power source. For example, the voltage signal may be filtered using a bandpass filter. In some examples, the bandpass filter may comprise a four pole 60 Hz bandpass filter with unity gain. The voltage signal output of such bandpass filter may be proportional to the current provided by the multi-phase power source. A harmonic distortion current reference signal may be generated by subtracting the fundamental current signal from the sensed current signal because the sensed current signal includes both the fundamental current signal and the harmonic currents. The harmonic distortion current reference signal may be represented by a voltage signal. Such voltage signal may be used to instruct the controllers 114 the amount of current to inject (e.g., I_ABinject, I_BCinject, and I_CAinject) in a given phase of the phases 102 to correct the distortion power factor.

The apparatus and functions of the phase balancer 100 and power conversion circuits 106 can be implemented using various hardware and software components. An exemplary schematic diagram of a portion of a power conversion circuit (e.g., power conversion circuits 106 of FIGS. 1 and 2) is depicted in FIG. 3. FIG. 3 includes details of components and configurations that may be used in switches 116, 118; capacitor bank 120, and H-bridge 124.

The switch 116 may include a transistor 128 and a diode 130 arranged in parallel (see FIG. 3). Similarly, the switch 118 may include a transistor 132 and a diode 134 arranged in parallel. The controller 114 may be operatively coupled to the gates of the transistors 128, 132 to open and close the switches 116, 118. The diodes 130, 134 may be arranged in series to allow current to flow in the direction of one end of the capacitor bank 120 regardless of the state of the transistors 128, 132 or diodes 130, 134.

The capacitor bank 120 may include nodes or nodes 135, 137, 139 and capacitive circuits 136, 138. The nodes 135, 139 reside at opposite ends of the capacitor bank with both capacitive circuits 136, 138 operatively coupled in series between them. The node 135 is operatively coupled to switch 116 and the node 139 is operatively coupled to the switch 118. The node 137 may be a neutral load at a point between capacitive circuits 136, 138. The capacitive circuits 136, 138 may include one or more capacitors or other components that result in a capacitive component or circuit. The capacitance of capacitive circuits 136, 138 may be approximately equal to allow the node 137 to be a neutral point of the capacitor bank 120. The node 137 is operatively coupled to a phase of the phases 102 different from the phase of the phases that is operatively coupled to the inductor 112. Such coupling of the node 137 to the return phase may ensure that voltage conditions between the power conversion circuits allow for current and energy to be moved between the phases 102 by the phase balancer 100. The nodes 135, 137 may also be operatively coupled to the H-bridge 124.

The H-bridge 124 may include switches 140-1, 140-2, 140-3, 140-4 (referred to collectively as switches 140) to define the DC-bus 122. The DC-bus 122 may include DC-line 122-1 and DC-line 122-2. The DC-lines 122-1, 122-2 may be operatively coupled to opposing sides of the winding 126. The switches 140 may include any suitable switching component, for example, transistors, solid state relays, etc. The switches 140 may be operatively coupled to and controlled by the controller 114. The switches 140 may be open or closed to maintain a voltage of each of the DC-lines 122-1, 122-2 and facilitate energy transfer between the power conversion circuits 106 via windings 126 of transformer 107. In one embodiment, the switches may be operated at a 50 percent duty cycle to maintain a voltage of the DC-lines 122-1, 122-2. Switches 140-1, 140-4 may be closed while switches 140-2, 140-3 are open and vice versa.

Figure 4:
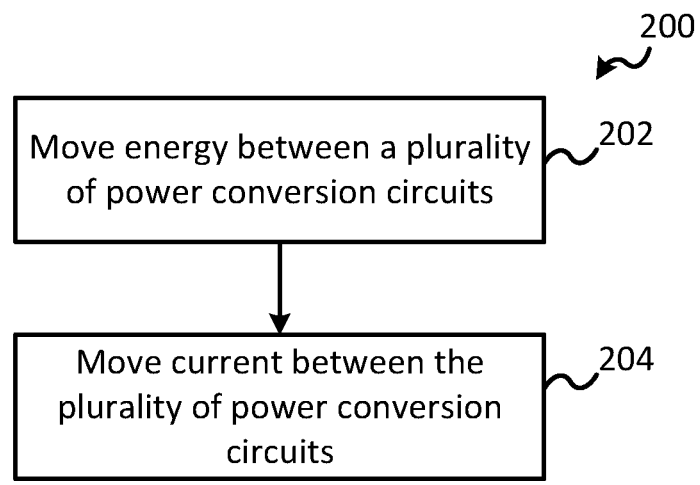
FIG. 4 is a flow diagram of an illustrative method for phase balancing a multi-phase power provided by a multi-phase power source.

An exemplary method or process 200 for balancing phases of a multi-phase power source is depicted in FIG. 4 using the phase balancer 100 of FIG. 1. The method 200 may include moving energy between the plurality of power conversion circuits 106 using the direct current transformer 107 operatively coupled to the direct current bus of each of the plurality of power conversion circuits. Energy may be moved from one power conversion circuit to another of the power conversion circuits 106 by regulating the voltage of the DC-buses of the power conversion circuits. A voltage of the direct current transformer may be senses using a voltage sensor. The voltage sensor may be incorporated into or operatively coupled to a controller (e.g., controller 114 of FIG. 2). The sensed voltage may be compared to a reference voltage using the controller. An amount of current to be drawn from the plurality of phases 102 to maintain the reference voltage may be determined using the controller.

The method 200 may further include moving current between the plurality of power conversion circuits 106 using a plurality of phase-nodes 103, each phase-node operatively coupled between a capacitor bank 120 of one of the plurality of power conversion circuits 106 and a throughput of another of the plurality of power conversion circuits.

Moving current between the plurality of power conversion circuits 106 may include phase balancing, displacement power factor correction, and distortion power factor correction. To balance the phases 102, current may be provided to each throughput (e.g., throughput 110 of FIG. 2) of the plurality of power conversion circuits using a current injector (e.g., controller 114; switches 116, 118; and capacitor bank 120 of FIG. 2). A current of each of the plurality of phases 102 and/or phase-legs may be determined using the controller 108 operatively coupled to the plurality of power conversion circuits and the current injector. The current supplied to the phases 102 via each throughput of the plurality of power conversion circuits 106 by the current injector may be adjusted based on the determined current of each of the phases.

Adjusting the current supplied to the phases 102 may include determining an average current based on the current of each of the one or more phases. An error signal for each of the phases 102 may be determined based on the average current and the current of each of the phases 102. The current supplied via each throughput may be adjusted based on the determined error signals.

To correct the displacement power factor (e.g., a lead or lag of a phase current relative to a phase voltage of the phases 102), a correction current may be determined and such correction current may be injected into one of the phase-nodes 103 or phase-legs based on the lead-lag of a phase-leg current relative to a phase-leg voltage. To determine the lead-lag of the phase-leg current, a phase-leg current waveform and a phase-to-phase voltage waveform may be determined. A zero-crossing of each of the phase-leg current waveform and the phase-to-phase voltage waveform may be determined. The injected current may be based on the zero-crossings of the phase current waveform and the phase-to-phase voltage waveform. The amplitude and phase of the injection current may be adjusted by the controller 108 until the zero-crossing of the phase-leg current is synchronized with the zero-crossing of the phase-to-phase voltage.

To correct the distortion power factor, a load current of a load 104 may be determined using a current sensor (e.g., I_ABload, I_BCload, I_CAload). A distortion current may be determined based on the sensed current using the controller 108 operatively coupled to the current sensor. To determine the distortion current, the sensed load current may be filtered using a bandpass filter and the resulting filtered current is compared to the sensed current. In other words, the distortion current may be a difference between the sensed current and the filtered current. A current may be injected into a phase-node 103 based on the determined distortion current using the controller 108.

The method 200 may further include maintaining a voltage of a direct current transformer 107. To maintain the voltage of the direct current transformer 107 a voltage of the direct current transformer 107 may be sensed using a voltage sensor. The sensed voltage may be compared to a reference voltage using controller 108. An amount of current to be drawn by from the plurality of phases 102 to maintain the voltage of the direct current transformer 107 may be determined using the controller 108. Furthermore, the voltage of the direct current bus may be maintained using an H-bridge (e.g., H-bridge 124 of FIGS. 2 and 3).

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The methods described in this disclosure, including those attributed to the systems, or various constituent components, may be implemented, at least in part, in hardware, software, firmware, or any combination thereof. For example, various aspects of the techniques may be implemented by the processing circuitry 14, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing circuitry 14 to support one or more aspects of the functionality described in this disclosure.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

The invention claimed is:

1. A phase balancer comprising:
   a plurality of power conversion circuits, each of the plurality of power conversion circuits comprising:
   a throughput;
   an inductive circuit operatively coupled to the throughput;
   a capacitor bank operatively coupled to the inductive circuit; and
   a direct current bus operatively coupled to the capacitor bank;
   a direct current transformer operatively coupled to the direct current bus of each of the plurality of power conversion circuits to move energy between the plurality of power conversion circuits;
   a plurality of phase-nodes, each phase-node operatively coupled to the capacitor bank of one of the plurality of power conversion circuits and the throughput of another of the plurality of power conversion circuits to move current between the plurality of power conversion circuits, each phase-node of the plurality of phase-nodes operatively couplable to a corresponding one of a plurality of phases of a multi-phase power source;
   a current injector to provide current to each throughput of the plurality of power conversion circuits; and a controller comprising one or more processors and operatively coupled to the plurality of power conversion circuits and the current injector, the controller configured to:
  determine a current of each of the plurality of phases; and
  adjust the current supplied to each throughput of the plurality of power conversion circuits by the current injector based on the determined current of each of the plurality of phases.

2. The phase balancer as in claim 1, wherein, to adjust the current supplied to each throughput of the plurality of power conversion circuits by the current injector based on the determined current of each of the plurality of phases, the controller is further configured to:
  determine an average current based on the current of each of the plurality of phases;
  determine an error signal for each of the plurality of phases based on the average current and the current of each of the plurality of phases; and
  adjust the current supplied to each throughput of the plurality of power conversion circuits by the current injector based on the determined error signal for each of the plurality of phases.

3. The phase balancer as in claim 1,
the controller further configured to:
  sense a voltage of the direct current transformer;
  compare the sensed voltage to a reference voltage; and
  determine an amount of current to be drawn from the plurality of phases.

4. The phase balancer as in claim 1, further comprising a current sensor to sense a load current of a load operatively coupled to one of the plurality of phases,
  wherein the controller is operatively coupled to the current sensor and further configured to:
    determine a distortion current based on the sensed load current; and
    inject current into a phase-node of the plurality of phase-nodes based on the determined distortion current.

5. The phase balancer as in claim 1, the controller is further configured to:
  determine a lead-lag of a phase current of a phase of the plurality of phases; and
  inject current into one of the plurality of phase-nodes based on the determined lead-lag of the phase current.

6. The phase balancer as in claim 5, wherein, to determine the lead-lag of the phase current, the controller is further configured to:
  determine a phase current waveform of the phase;
  determine a phase-to-phase voltage waveform of the phase and another phase of the plurality of phases;
  determine a zero-crossing of each of the phase current waveform and the phase-to-phase voltage waveform; and
  wherein the current injected into the one of the plurality of phase-nodes is based on the zero-crossings of the phase current waveform and the phase-to-phase voltage waveform.

7. The phase balancer as in claim 1, wherein each of the plurality of power conversion circuits further comprise:
  a positive switch operatively coupled between the inductive circuit and a positive node of the capacitor bank; and
  a negative switch operatively coupled between the inductive circuit and a negative node of the capacitor bank.

8. The phase balancer as in claim 7, wherein each of the plurality of power conversion circuits further comprise a power conversion circuit controller operatively coupled to the positive switch and the negative switch and configured to open and close the positive switch and the negative switch based on a voltage difference between the throughput and a neutral node of the capacitor bank.

9. The phase balancer as in claim 1, wherein the plurality of power conversion circuits comprises three power conversion circuits and the phase balancer is a three-phase balancer.

10. The phase balancer as in claim 1, wherein each of the plurality of power conversion circuits comprises an H-bridge comprising the direct current bus and operatively coupled to the capacitor bank and the direct current transformer to maintain a voltage of the direct current bus.

11. A method comprising:
  moving energy between a plurality of power conversion circuits using a direct current transformer operatively coupled to a direct current bus of each of the plurality of power conversion circuits;
  moving current between the plurality of power conversion circuits using a plurality of phase-nodes, each phase-node operatively coupled between a capacitor bank of one of the plurality of power conversion circuits and a throughput of another of the plurality of power conversion circuits, each phase-node of the plurality of phase-nodes operatively couplable to a corresponding one of a plurality of phases of a multi-phase power source;
  providing current to each throughput of the plurality of power conversion circuits using a current injector;
  determining a current of each of the plurality of phases using a controller comprising one or more processors and operatively coupled to the plurality of power conversion circuits and the current injector; and
  adjusting the current supplied to each throughput of the plurality of power conversion circuits by the current injector based on the determined current of each of the plurality of phases.

12. The method as in claim 11, wherein adjusting the current supplied to each throughput of the plurality of power conversion circuits by the current injector based on the determined current of each of the plurality of phases comprises:
  determining an average current based on the current of each of the plurality of phases;
  determining an error signal for each of the plurality of phases based on the average current and the current of each of the plurality of phases; and
  adjusting the current supplied to each throughput of the plurality of power conversion circuits by the current injector based on the determined error signal for each of the plurality of phases.

13. The method as in claim 11, further comprising:
sensing a voltage of the direct current transformer;
comparing the sensed voltage to a reference voltage using the controller; and
determining an amount of current to be drawn from the plurality of phases to maintain the reference voltage using the controller.

14. The method as in claim 11, further comprising:
sensing a load current of a load using a current sensor;
determining a distortion current based on the sensed load current using the controller; and injecting current into a phase-node of the plurality of phase-nodes based on the determined distortion current using the controller.

15. The method as in claim 11, further comprising:
determining a lead-lag of a phase current of a phase of the plurality of phases; and
injecting current into one of the plurality of phase-nodes based on the determined lead-lag of the phase current.

16. The method as in claim 15, wherein determining the lead-lag of the phase current comprises:
determining a phase current waveform;
determining a phase-to-phase voltage waveform;
determining a zero-crossing of each of the phase current waveform and the phase-to-phase voltage waveform; and
wherein injecting the current into the one of the plurality of phase-nodes is based on the zero-crossings of the phase current waveform and the phase-to-phase voltage waveform.

17. The method as in claim 11, further comprising maintaining a voltage of the direct current bus using an H-bridge comprising the direct current bus and operatively coupled to the capacitor bank and the direct current transformer.

18. A phase balancer comprising:
a plurality of power conversion circuits, each of the plurality of power conversion circuits comprising:
a throughput;
an inductive circuit operatively coupled to the throughput;
a capacitor bank operatively coupled to the inductive circuit, the capacitor bank comprising:
a positive node;
a neutral node; and
a negative node;
an H-bridge operably coupled to the positive and negative nodes of the capacitor bank;
a direct current transformer operably coupled to the H-bridge of each of the plurality of power conversion circuits;
a plurality of phase-nodes, each phase-node operatively coupled between the neutral node of the capacitor bank of one of the plurality of power conversion circuits and the throughput of another of the plurality of power conversion circuits, each phase-node of the plurality of phase-nodes operatively couplable to a corresponding one of a plurality of phases of a multi-phase power source;
a current injector to provide current to each throughput of the plurality of power conversion circuits; and
a controller comprising one or more processors and operatively coupled to the plurality of power conversion circuits and the current injector, the controller configured to:
determine a current of each of the plurality of phases; and
adjust the current supplied to each throughput of the plurality of power conversion circuits by the current injector based on the determined current of each of the plurality of phases.

19. The phase balancer as in claim 18,
the controller further configured to:
sense a voltage of the direct current transformer;
compare the sensed voltage to a reference voltage; and
determine an amount of current to be drawn from the plurality of phases to maintain the reference voltage.

20. A phase balancer comprising:
a plurality of power conversion circuits, each of the plurality of power conversion circuits comprising:
a throughput;
an inductive circuit operatively coupled to the throughput;
a capacitor bank operatively coupled to the inductive circuit; and
a direct current bus operatively coupled to the capacitor bank;
a direct current transformer operatively coupled to the direct current bus of each of the plurality of power conversion circuits to move energy between the plurality of power conversion circuits;
a plurality of phase-nodes, each phase-node operatively coupled to the capacitor bank of one of the plurality of power conversion circuits and the throughput of another of the plurality of power conversion circuits to move current between the plurality of power conversion circuits, each phase-node of the plurality of phase-nodes operatively couplable to a corresponding one of a plurality of phases of a multi-phase power source;
a current sensor to sense a load current of a load operatively coupled to one of the plurality of phases; and
a controller comprising one or more processors and operatively coupled to the current sensor and configured to:
determine a distortion current based on the sensed load current; and
inject current into a phase-node of the plurality of phase-nodes based on the determined distortion current.

21. The phase balancer as in claim 20, the controller further configured to:
sense a voltage of the direct current transformer;
compare the sensed voltage to a reference voltage; and
determine an amount of current to be drawn from the plurality of phases.

22. The phase balancer as in claim 20, the controller is further configured to:
determine a lead-lag of a phase current of a phase of the plurality of phases; and
inject current into one of the plurality of phase-nodes based on the determined lead-lag of the phase current.

23. The phase balancer as in claim 22, wherein, to determine the lead-lag of the phase current, the controller is further configured to:
determine a phase current waveform of the phase;
determine a phase-to-phase voltage waveform of the phase and another phase of the plurality of phases;
determine a zero-crossing of each of the phase current waveform and the phase-to-phase voltage waveform; and
wherein the current injected into the one of the plurality of phase-nodes is based on the zero-crossings of the phase current waveform and the phase-to-phase voltage waveform.

24. The phase balancer as in claim 20, wherein each of the plurality of power conversion circuits further comprise:
a positive switch operatively coupled between the inductive circuit and a positive node of the capacitor bank; and
a negative switch operatively coupled between the inductive circuit and a negative node of the capacitor bank.

25. The phase balancer as in claim 24, wherein each of the plurality of power conversion circuits further comprise a power conversion circuit controller operatively coupled to the positive switch and the negative switch and configured to open and close the positive switch and the negative switch based on a voltage difference between the throughput and a neutral node of the capacitor bank.

26. The phase balancer as in claim 20, wherein the plurality of power conversion circuits comprises three power conversion circuits and the phase balancer is a three-phase balancer.

27. The phase balancer as in claim 20, wherein each of the plurality of power conversion circuits comprises an H-bridge comprising the direct current bus and operatively coupled to the capacitor bank and the direct current transformer to maintain a voltage of the direct current bus.

28. A method comprising:
moving energy between a plurality of power conversion circuits using a direct current transformer operatively coupled to a direct current bus of each of the plurality of power conversion circuits;
moving current between the plurality of power conversion circuits using a plurality of phase-nodes, each phase-node operatively coupled between a capacitor bank of one of the plurality of power conversion circuits and a throughput of another of the plurality of power conversion circuits, each phase-node of the plurality of phase-nodes operatively couplable to a corresponding one of a plurality of phases of a multi-phase power source;
sensing a load current of a load using a current sensor;
determining a distortion current based on the sensed load current using a controller comprising one or more processors and operatively coupled to the current sensor; and
injecting current into a phase-node of the plurality of phase-nodes based on the determined distortion current using the controller.

29. The method as in claim 28, further comprising:
sensing a voltage of the direct current transformer;
comparing the sensed voltage to a reference voltage using the controller; and
determining an amount of current to be drawn from the plurality of phases to maintain the reference voltage using the controller.

30. The method as in claim 28, further comprising:
determining a lead-lag of a phase current of a phase of the plurality of phases; and
injecting current into one of the plurality of phase-nodes based on the determined lead-lag of the phase current.

31. The method as in claim 30, wherein determining the lead-lag of the phase current comprises:
determining a phase current waveform;
determining a phase-to-phase voltage waveform;
determining a zero-crossing of each of the phase current waveform and the phase-to-phase voltage waveform; and
wherein injecting the current into the one of the plurality of phase-nodes is based on the zero-crossings of the phase current waveform and the phase-to-phase voltage waveform.

32. The method as in claim 28, further comprising maintaining a voltage of the direct current bus using an H-bridge comprising the direct current bus and operatively coupled to the capacitor bank and the direct current transformer.

* * * * *